United States Patent

[11] 3,589,779

| | | |
|---|---|---|
| [72] | Inventor | Ned L. Sokol<br>Van Nuys, Calif. |
| [21] | Appl. No. | 879,308 |
| [22] | Filed | Nov. 24, 1969 |
| [45] | Patented | June 29, 1971 |
| [73] | Assignee | Rex Chainbelt Inc.<br>Milwaukee, Wis. |

[54] SEALED LOADER SLOT BEARING
9 Claims, 7 Drawing Figs.

| [52] | U.S. Cl. | 308/72 |
|---|---|---|
| [51] | Int. Cl. | F16c 11/06 |
| [50] | Field of Search | 308/29, 72,<br>194; 287/88 |

[56] References Cited
UNITED STATES PATENTS
2,047,885  7/1936  Riebe .......................... 308/29

*Primary Examiner*—Martin P. Schwadron
*Assistant Examiner*—Frank Susko
*Attorneys*—Ernst W. Schultz and Joseph J. Jochman, Jr.

ABSTRACT: The loader slots machined in the outer race of a spherical bearing to facilitate insertion of the bearing inner race are sealed after assembly of the bearing by filling them with a metallic material. The loader slots are provided with recessed portions which are filled by the metallic sealing material in a manner such that the hardened material is keyed against displacement by radial or thrust forces or bearing rotation.

PATENTED JUN29 1971 3,589,779
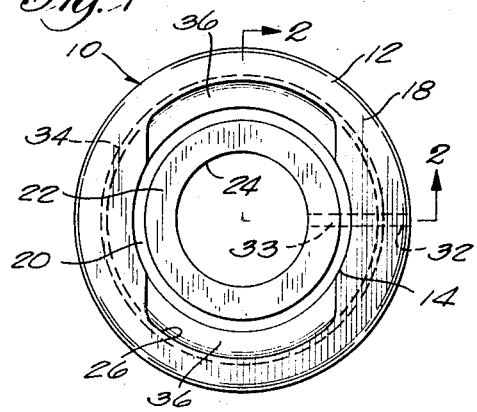
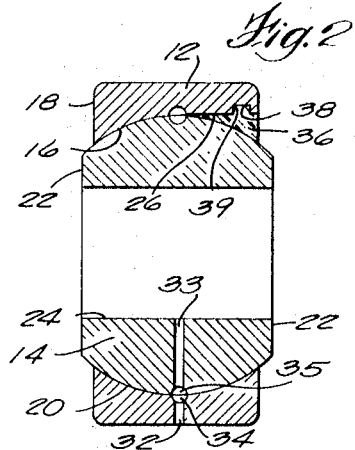
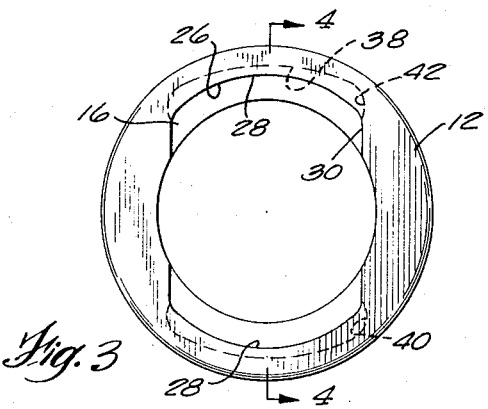
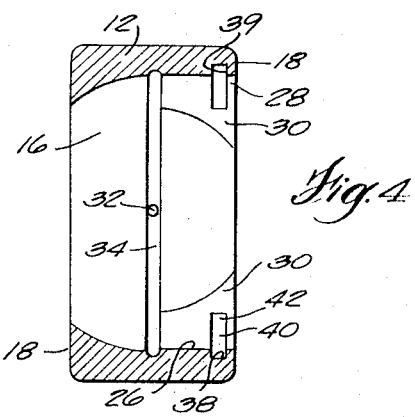
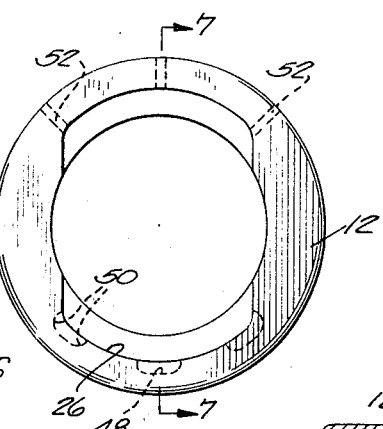
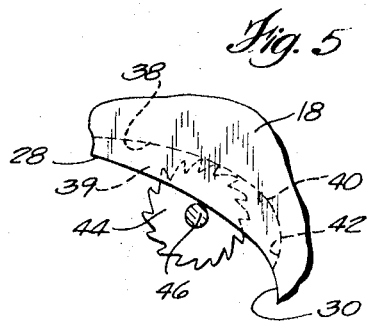
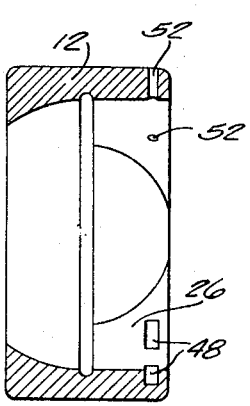
Inventor
Ned L. Sokol
By Joseph J. Jochman Jr.
Attorney

SEALED LOADER SLOT BEARING

BACKGROUND OF THE INVENTION

The present invention relates to spherical self-aligning bearings of the type wherein one or more loader slots are cut in the outer race to provide clearance for the endwise insertion of the inner race in the assembly of the bearing. More particularly, this invention pertains to a bearing in which the loader slots are sealed after the bearing is assembled.

Spherical self-aligning bearings are well-known in the art. The simplest of these is the plain metal-to-metal type wherein a unitary inner race member with a spherical outer bearing surface and circular parallel ends is mounted for universal movement within an annular outer race member having a spherical inner bearing surface. It is also known to provide one face of the outer race member with a pair of diametrically opposite loader slots adapted to receive the inner race member inserted endwise therethrough in the assembly of the bearing.

A desireable characteristic of the loader slot type bearing as compared to a spherical bearing made, for example, by pressing and deforming an outer race member around a spherical inner race is that the spherical inner surface of the outer race may be more precisely formed before assembly. Thus, in a bearing provided with loader slots, both spherical race surfaces may be machined and ground prior to assembly to more exacting tolerances, and the assembled bearing exhibits a greater uniformity in internal clearance than a bearing in which the outer race is pressed around the inner race.

Loader slot bearings, however, have historically exhibited one undesireable characteristic, namely, an excessively high wear rate. It has been found that open loader slots allow bearing lubricant to escape and contaminants to enter which, in combination, cause rapid wear and premature bearing failure. In certain applications it is necessary to provide lubrication to the bore of the inner race and the pin or shaft upon which the bearing is mounted. Lubrication is generally supplied to the spherical bearing surfaces through radial holes drilled in the outer race member and, if through-lubrication to the bore is desired, similar radial holes are provided in the inner race member. Open loader slots not only allow the escape of lubricant supplied to the spherical bearing surfaces, but prevent effective through-lubrication to the bore.

Means and materials heretofore used in attempts to seal the loader slots of assembled bearings have all had various drawbacks affecting the quality of the seal and/or the operation of the bearing. Thus, for example, it has been found that materials which provide an effective seal are difficult to insert in the loader slots and are generally incompatible with the bearing metal. On the other hand, materials which are easier to install are in general more difficult to retain in place and exhibit less effective sealing capabilities.

SUMMARY OF THE INVENTION

The present invention is directed to an improved means for sealing the loader slots of a spherical bearing after assembly wherein the sealing material is effectively retained in place.

In the preferred embodiment, the sealing material is a thermosetting metal base filler. The uncured filler material, due to its plastic nature, may be readily inserted to fill the loader slots after insertion of the inner race member. The metal base of the sealing material is the same as or compatible with the bearing metal such that, upon curing, the seals exhibit substantially the same physical properties as the bearing metal.

The loader slot surfaces are provided with depressions or annular grooves into which the filler material flows and upon curing secures the seals against displacement or extrusion by thrust forces acting on the bearing. In the preferred embodiment, the grooves are additionally deepened near their ends to provide abutments which aid in keying the seals against displacement or extrusion by radial bearing loads or rotation of the bearing.

BRIEF DESCRIPTION OF THE DRAWING

FIG. 1 is an end elevation view of an assembled bearing of the present invention.

FIG. 2 is a sectional view of the bearing taken on line 2-2 of FIG. 1.

FIG. 3 is an end elevation view of the outer race member of the bearing shown in FIG. 1.

FIG. 4 is a sectional view of the outer race member taken on line 4-4 of FIG. 3.

FIG. 5 is an enlarged detail of a portion of the outer race member of FIG. 4 and additionally showing the groove-forming tool.

FIG. 6 is an end elevation view of a bearing outer race member showing alternate seal retaining means.

FIG. 7 is a sectional view of the outer race member taken on line 7-7 of FIG. 6.

DESCRIPTION OF THE PREFERRED EMBODIMENT

In the drawing, FIGS. 1 and 2 show a spherical self-aligning bearing 10 of the present invention. The bearing includes an outer race member 12 and an inner race member 14.

The outer race member 12 has a spherical inner bearing surface 16 between circular parallel ends 18. The inner race member 14 has a spherical outer bearing surface 20 between circular parallel ends 22. The inner member 14 is provided with a cylindrical bore 24 the axis of which is perpendicular to the circular ends 22.

Referring to FIGS. 3, 4 and 5, the outer race member 12 is provided with a pair of diametrically opposite loader slots 26 machined in one of the ends 18 thereof. Each of the loader slots 26 has an intermediate cylindrical surface 28 between parallel end faces 30. The loader slots extend inwardly from the circular end 18 to the center of the outer race member 12 such that the intermediate cylindrical surface 28 lies tangent to the spherical inner bearing surface 16 on the line formed by a plane through the center of the outer race member and parallel to the circular ends 18.

The distance between the parallel end faces 30 of the loader slots 26 is slightly greater than the width of the inner race member 14 between its circular parallel ends 22. In this manner, the inner race member 14 may be inserted endwise, i.e. rotated 90° from its position shown in FIGS. 1 and 2, through the loader slots until the spherical outer bearing surface 20 meets the corresponding inner bearing surface 16 of the outer race member 12. The inner race member may then be rotated 90° to the assembled position shown.

Metal-to-metal bearings in general require lubrication between the bearing surfaces for effective operation and adequate bearing life. In a spherical bearing of the type disclosed herein, lubrication is generally provided by means of one or more radial lubrication holes 32 extending through the outer race member 12 and communicating with an annular lubrication groove 34 machined in the spherical inner bearing surface 16. The open lubrication hole in the outer periphery of the outer race member 12 may be provided with a standard lubrication fitting (not shown). It is also desirable in many applications to provide lubrication to the bore 24 of the inner race member 14 and the shaft or pin on which it is mounted (not shown). For this purpose, radial through-lubrication holes 33 are provided in the inner race member 14 similar to the lubrication holes 32 in the outer race member 12. A corresponding lubrication groove 35 may also be provided in the bearing surface 20 of inner member 14.

As may be seen particularly in FIGS. 2 and 4, the loader slot 26 extends into the lubrication groove 34 and there is thus a direct opening to the lubrication grooves in an assembled bearing through the unfilled loader slots. This opening has been the cause of loss of lubricant supplied to the bearing through the lubrication hole 32. The opening also allows dirt and other foreign materials to enter the bearing and, as stated above, thereby adds to increased wear and premature failure.

The lubrication grooves 34 and 35 may be formed offset from the median planes of the respective outer and inner bearing members and toward the end opposite the loader slots in a known manner. The direct opening to the lubrication grooves through the unfilled loader slots may be thereby eliminated. However, this is the case only when the bearing is aligned, and misalignment of the ball or inner bearing member 14 can cause movement of the lubrication groove 35 into the open loader slot where loss of lubricant may occur as described above. Foreign materials, of course, can enter the open loader slot regardless of the position of the grooves.

To prevent lubricant efflux and contaminant influx, the loader slots 26 of the assembled bearing may be filled and the openings thereby sealed. In the preferred embodiment, the seals 36 are formed from a thermosetting metal base material and molded in place. For example, in a bearing in which the race members are made of stainless steel, the loader slots are filled with a puttylike material comprising powdered stainless steel in a thermosetting epoxy binder, such as that sold under the brand name Devcon ST. Upon setting, the filler material provides effective and permanent seals that maintain the lubricant within the bearing and preclude the entry of foreign materials.

The loader slot filler material is characterized by its negligible shrinkage upon curing which makes it ideally suited as a sealing material. Its puttylike consistency in the uncured state allows it to be quickly and simply molded into place. Once in place, it sets rapidly at room temperatures, is chemically stable and, when set, exhibits high shear and compressive strengths. Also, because the metal base comprises the greater proportion of the filler, its coefficient of thermal expansion closely parallels that of the bearing metal over the broad range of temperatures within which the bearing is designed to operate.

The epoxy binder provides some bonding of the seals 36 to the surfaces of the loader slots 26 and the bearing surface 20 of the inner member 14 must be appropriately coated to prevent the filler material from bonding thereto. It has been found, however, that the loads to which the bearings are subjected in service require additional means to secure the seals from displacement or to prevent their extrusion between the bearing surfaces. The present invention provides recessed portions in the loader slot surfaces to aid in holding the hardened sealing material in place. In the preferred embodiment, an annular groove 38 is formed in the cylindrical surface 28 of each loader slot, as for example in a milling operation. The grooves 38 so formed are readily filled by the sealing material and the sides 39 of the grooves effectively key the hardened material against displacement by thrust forces or the forces acting substantially axially of the bearing.

The seals 36 are also subject to the effects of radial bearing loads which also tend to dislodge the seals; and relative rotation of the bearing members can cause the extrusion of the seal material between the spherical bearing surfaces 16 and 20. To prevent this, the annular grooves 38 are provided with deepened end portions 40 the sides of which form abutment surfaces 42 disposed substantially radially with respect to the bearing axis and perpendicular to the sides 39 of the grooves 38. The sealing material flows into and fills the end portions 40 as the loader slots are filled and is keyed, upon setting, by the abutment surfaces 42 against displacement by radial forces or those forces acting substantially perpendicular to the bearing axis.

Referring to FIG. 5, the loader slot grooves 38 are preferrably formed with an end mill cutter 44. The diameter of the cutter 44 should be just large enough to provide the desired depth of the end portions 40 with clearance for the cutter shaft 46. By utilizing a minimum diameter cutter 44, the angle at which the abutment surfaces 42 meet the loader slot surfaces 28 is the maximum practically attainable. In this manner, the abutment surfaces provide the most effective keying of the seals 36.

As shown in FIGS. 4 and 5, the end portions 40 at the ends of the grooves 38 preferrably terminate within the end faces 30 of the loader slots 26. The entire groove 38 may thus be formed without cutting into any part of the spherical inner bearing surface 16, thereby avoiding the formation of a metal burr in the finished bearing surface 16.

Alternate means for keying the seals 36 in place may also be used. FIGS. 6 and 7 show two alternative means of securing the seals in position. Instead of the continuous annular groove 38 of the preferred embodiment, the keying means may comprise a series of aligned intermittent grooves 48. Each of the grooves 48 provides a pair of abutment surfaces 50 similar to the surfaces 42 at the ends of the continuous groove 38 of the preferred embodiment. The intermittent grooves may be formed with the same tooling and in a manner similar to that used to form a continuous groove.

Seal retaining means may also be provided by one or more radial holes 52 drilled through the outer race member into the loader slot. Preferably, a series of holes, aligned in the manner of the intermittent grooves 48, are employed.

Though the invention has been shown and described with reference to particular embodiments, it will be understood by those skilled in the art that various changes may be made in form and detail without departing from the spirit and scope of the invention.

What I claim is:

1. In a bearing assembly comprising inner and outer members having corresponding spherical bearing surfaces between circular parallel ends, the outer member having a pair of loader slots each defined by spaced parallel end faces and an intermediate cylindrical surface, the improvement comprising a hardened material filling said loader slots of the assembled bearing, and recessed portions in the surfaces of said loader slots adapted to receive a portion of said hardened material, whereby said material is keyed against displacement.

2. In a bearing comprising inner and outer members having corresponding spherical bearing surfaces between circular parallel ends, the outer member having a pair of loader slots each defined by spaced parallel end faces and an intermediate cylindrical surface extending from one end of the outer member inwardly to the median plane thereof, the improvement comprising grooved portions in the surfaces of said loader slots, said portions having mutually perpendicular sides and ends, and a hardened material filling said loader slots and said grooved portions, whereby said loader slots are sealed and said hardened material is keyed by the sides and ends of said grooved portions against displacement.

3. A bearing as defined in claim 2 wherein said grooved portions lie substantially within the intermediate cylindrical surfaces of said loader slots.

4. A bearing as defined in claim 3 wherein said grooved portions comprise a continuous annular groove in each loader slot.

5. A bearing as defined in claim 4 wherein said annular groove includes deepened end portions.

6. A bearing as defined in claim 2 wherein said hardened material comprises a thermosetting metal base material.

7. In a bearing assembly comprising inner and outer members having corresponding spherical bearing surfaces between circular parallel ends, the outer member having a pair of loader slots each defined by spaced parallel end faces and an intermediate cylindrical surface extending from one end of the outer member inwardly to the median plane thereof, the improvement comprising an annular groove in the cylindrical surface of each loader slot, said groove having deepened end portions terminating within the loader slot, and a hardened material filling said loader slots and said annular grooves, whereby said loader slots are sealed and said hardened material is keyed against displacement.

8. A bearing assembly as described in claim 7 wherein said hardened material comprises a thermosetting metal base material.

9. A bearing assembly as defined in claim 7 wherein said annular groove interconnects the parallel end faces of said loader slot and lies intermediate the end and the median plane of the outer member.